(12) United States Patent
Ursell et al.

(10) Patent No.: US 10,183,395 B2
(45) Date of Patent: Jan. 22, 2019

(54) ANGLE DIVIDER FOR MITER SAW

(71) Applicant: Affinity Tool Works, LLC, Troy, MI (US)

(72) Inventors: Mike Ursell, Bloomfield Hills, MI (US); Connor Ursell, Bloomfield Hills, MI (US); Ken Neilson, Troy, MI (US)

(73) Assignee: AFFINITY TOOL WORKS, LLC, Troy, MI (US)

( * ) Notice: Subject to any disclaimer, the term of this patent is extended or adjusted under 35 U.S.C. 154(b) by 218 days.

(21) Appl. No.: 15/372,551

(22) Filed: Dec. 8, 2016

(65) Prior Publication Data

US 2017/0157764 A1 Jun. 8, 2017

Related U.S. Application Data

(60) Provisional application No. 62/264,415, filed on Dec. 8, 2015.

(51) Int. Cl.
| | |
|---|---|
| *G01B 3/56* | (2006.01) |
| *B25H 7/00* | (2006.01) |
| *B23D 47/04* | (2006.01) |
| *B23D 45/14* | (2006.01) |

(52) U.S. Cl.
CPC .............. *B25H 7/00* (2013.01); *B23D 47/04* (2013.01); *G01B 3/56* (2013.01); *B23D 45/14* (2013.01)

(58) Field of Classification Search
CPC ... G01B 3/04; G01B 3/56; B25H 1/04; B25H 1/14; B25H 1/16; B25H 3/00
USPC ........................................................... 33/456
See application file for complete search history.

(56) References Cited

U.S. PATENT DOCUMENTS

| | | | | |
|---|---|---|---|---|
| 361,243 | A * | 4/1887 | Strubel ................... | G01B 3/56 33/455 |
| 1,454,782 | A * | 5/1923 | Wimmer ................. | B25D 5/02 33/42 |
| 1,660,578 | A * | 2/1928 | Reppell .................... | B25D 5/02 33/455 |
| 2,222,853 | A * | 11/1940 | Neurohr ................... | G01B 3/56 33/1 AP |

(Continued)

FOREIGN PATENT DOCUMENTS

DE 10 2007 003420 7/2008

OTHER PUBLICATIONS

International Search Report dated Apr. 6, 2017.

*Primary Examiner* — Yaritza Guadalupe-McCall
(74) *Attorney, Agent, or Firm* — William H. Honaker; Dickinson Wright PLLC

(57) ABSTRACT

An angle divider includes a body portion with a proximate end and a distal end. A distal end pivot point is positioned in the distal end of the body portion. A fixed arm and a removable arm are pivotally mounted to the distal end pivot point. The arms and pivot with respect to the distal end pivot point. An adjustable pivot is mounted for sliding movement within an elongated slot formed in the body portion. Brackets interconnect the arms to the adjustable pivot. Movement of the arms results in movement of the adjustable pivot longitudinally along the body portion. A lock 26 locks the adjustable pivot with respect to the body portion, which locks the arms in place with respect to the body portion. The removable arm can be removed from the distal end pivot point and the adjustable pivot point to split the angle.

20 Claims, 3 Drawing Sheets

(56) References Cited

U.S. PATENT DOCUMENTS

| | | | | |
|---|---|---|---|---|
| 3,562,919 A * | 2/1971 | Green | ............... | B25H 7/04 33/25.1 |
| 4,527,341 A * | 7/1985 | Schon | ............... | G01B 5/24 33/25.1 |
| 5,473,821 A * | 12/1995 | DiMarco | ............ | B27B 27/06 33/456 |
| 6,604,294 B1 * | 8/2003 | Farley | ............... | B25H 7/00 33/27.03 |
| 6,877,238 B2 * | 4/2005 | Kanaga | ............ | B23D 59/002 33/455 |
| 7,774,947 B1 * | 8/2010 | Russo | ............ | B23D 47/02 33/455 |
| 9,989,346 B2 * | 6/2018 | Clerc | ............... | G01B 3/56 |
| 2004/0237320 A1 * | 12/2004 | Kanaga | ............ | B23D 59/002 33/455 |
| 2007/0022856 A1 * | 2/2007 | Paine | ............... | B25H 7/00 83/522.11 |
| 2007/0227022 A1 * | 10/2007 | Bruce | ............... | B43L 7/10 33/455 |
| 2016/0363429 A1 * | 12/2016 | Clerc | ............... | G01B 3/56 |
| 2017/0157764 A1 * | 6/2017 | Ursell | ............ | B23D 47/04 |

\* cited by examiner

ANGLE DIVIDER FOR MITER SAW

RELATED APPLICATIONS

This application claims the benefit of U.S. Provisional Patent Application Ser. No. 62/264,415, filed Dec. 8, 2015, the entire disclosure of the application being considered part of the disclosure of this application and hereby incorporated by reference.

STATEMENT REGARDING FEDERALLY SPONSORED RESEARCH

NONE.

TECHNICAL FIELD

This invention relates generally to a tool for use in determining either the interior or exterior angle between two joined surfaces and then dividing that angle. The tool is particularly beneficial for use with miter saws and the cutting of material to be joined at a specific angle.

BACKGROUND OF THE INVENTION

A common problem when cutting for example molding with a miter saw is that the joined walls and ceilings etc. are not even and the joint is not exactly at right angles. If the molding is cut at right angles, there will be unsightly gaps between the joint of the joined moldings, between the moldings and the wall or ceiling, etc.

What is needed is a tool that can accurately determine the angle of the joint so that it can be easily and accurately transferred to the miter saw so that exact and accurate cuts can be made resulting in no gaps between any joints or surfaces. It is also desired to have a tool that is easy to use and can be used with any type of saw.

DETAILED DESCRIPTION OF A PREFERRED EMBODIMENT

Figure 1:
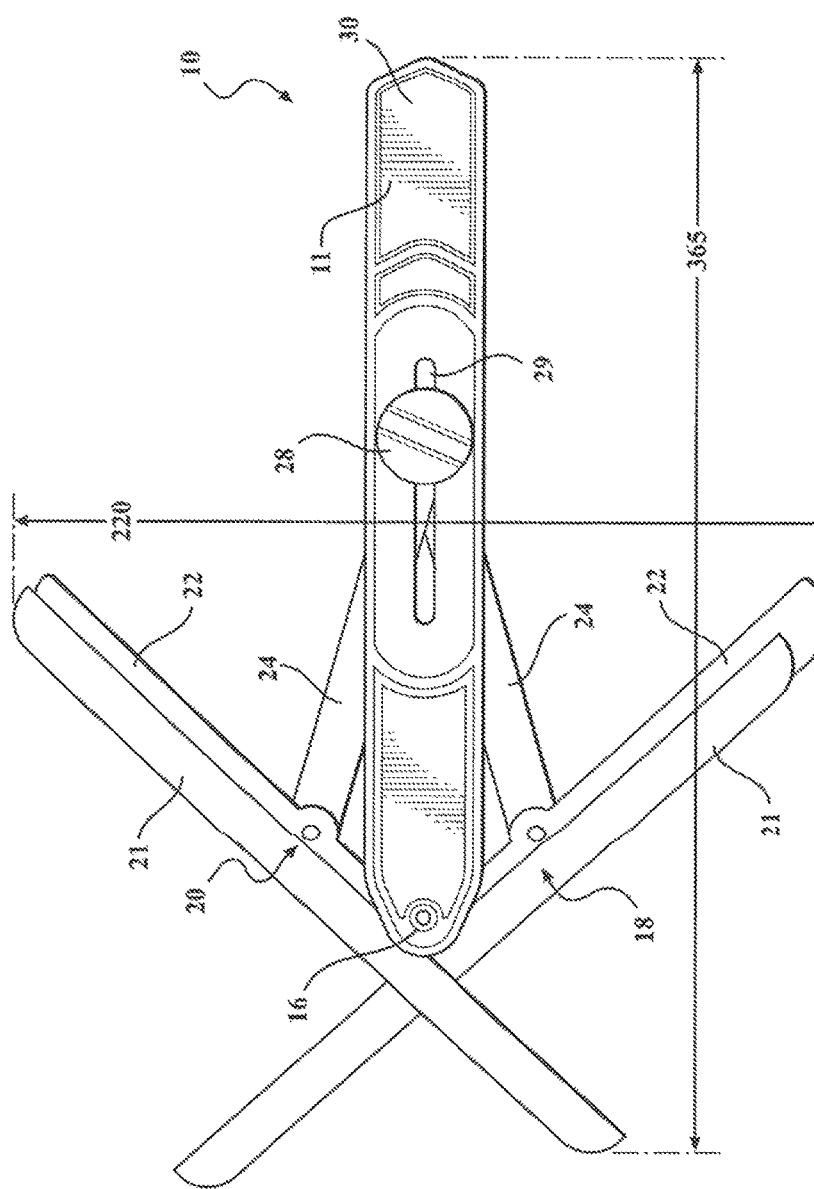
FIG. 1 is a top view of the angle divider of the present invention in the open position.

The angle divider of the present invention is shown generally at 10 in FIGS. 1 through 5. The angle divider 10 includes a body portion 11 having a proximate end 12 and a distal end 14. A distal end pivot point 16 is positioned in the distal end 14 of the body portion 11. A fixed arm 18 and a removable arm 20 are mounted to the distal end pivot point 16. The arms 18 and 20 are mounted to pivot with respect to the distal end pivot point 16.

The arms 18 and 20 each include a sliding finger 21 mounted on tracks 22. The fingers 21 slide with respect to the tracks 22 to extend and retract with respect to the tracks 22 and the body portion 11. In the disclosed embodiment, the tracks 22 have channels that receive the longitudinal edge of the fingers 21 to allow the fingers 21 to slide with respect to the tracks 22.

Brackets 24 connect the arms 18 and 20 to the body 11. The arms 18 and 20 are connected to the body 11 through the tracks 22. The brackets 24 extend between the tracks 22 and an adjustable pivot 28 mounted to the body 11. The brackets 24 pivotally attach to the arms 18 and 20 at track pivot points 25.

Figure 2:
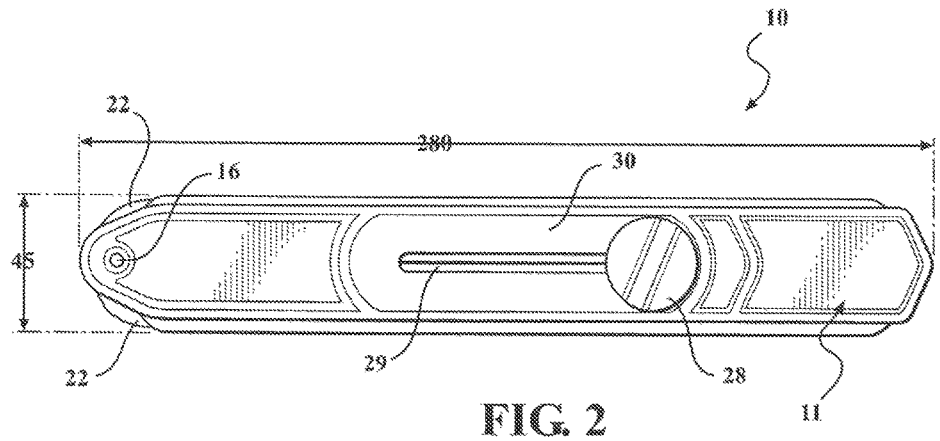
FIG. 2 is a top view of the angle divider of the present invention in the closed position.
Figure 5:
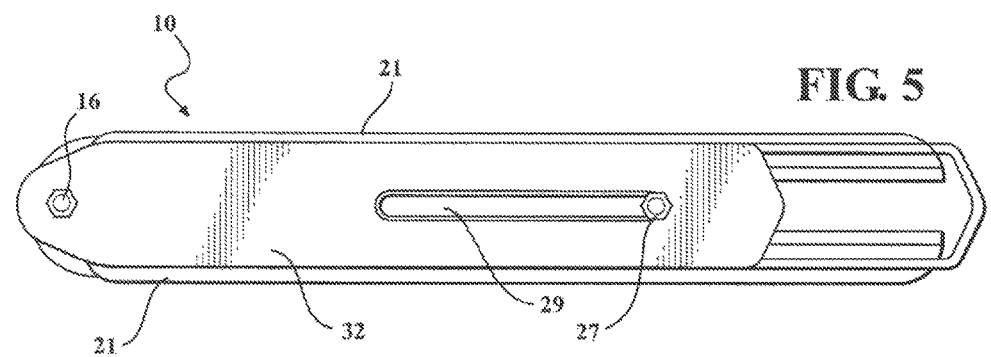
FIG. 5 is a bottom view of the angle divider of the present invention in the closed position.

The adjustable pivot 28 includes a lock 26 and a shaft 27, see FIG. 5. The shaft 27 extends through a slot 29. In the disclosed embodiment, the body 11 has a top surface 30 and bottom surface 32 that are spaced from one another. The spacing of the top 30 and bottom 32 creates a cavity 33 for receipt of the arms 18 and 20 when the angle divider is in the closed position as shown in FIGS. 2 and 5. In the disclosed embodiment, the top 30 and bottom 32 are separated by the distal end pivot point 16 and a proximate end wall 33.

As disclosed, the shaft 27 extends through the top 30 and bottom 32. A fastener connects the shaft 27 to the bottom 32 and a lock 26 connects the shaft to the top 30. The lock as disclosed is a knob that can be screwed against the top 30 and lock the position of the shaft 27 with respect to the slot 29. It should be appreciated that other locking mechanisms could be used, for example, a spring loaded latch, a ratchet type lock, etc.

Figure 3:
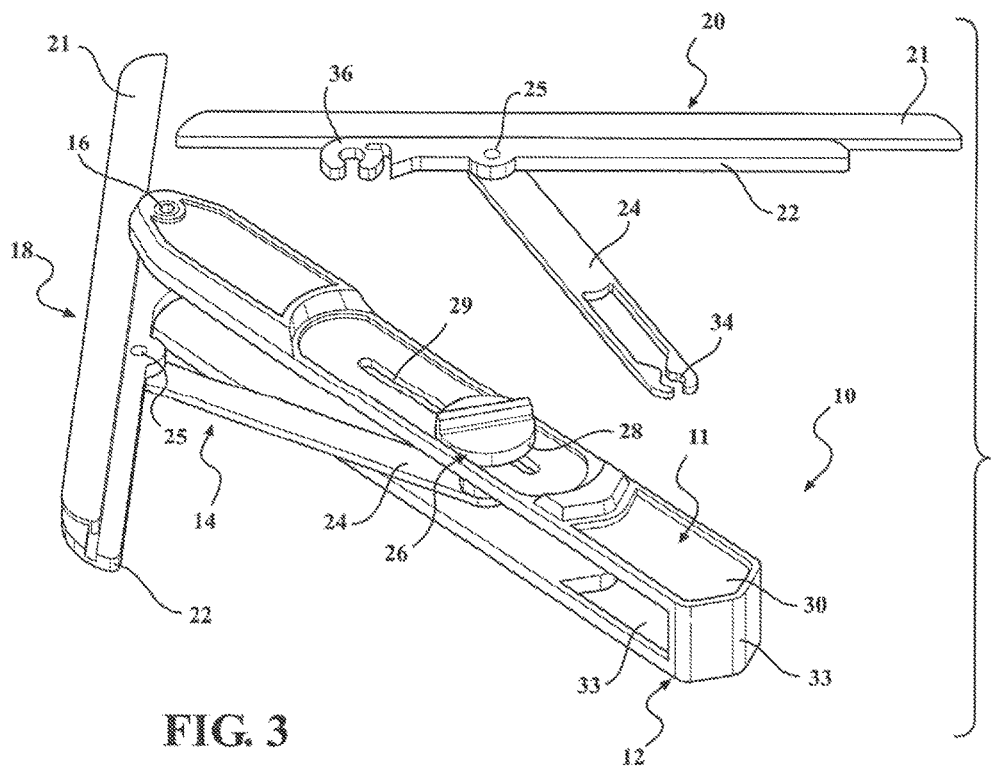
FIG. 3 is a perspective view of the angle divider of the present invention split for use on a miter saw.
Figure 4:
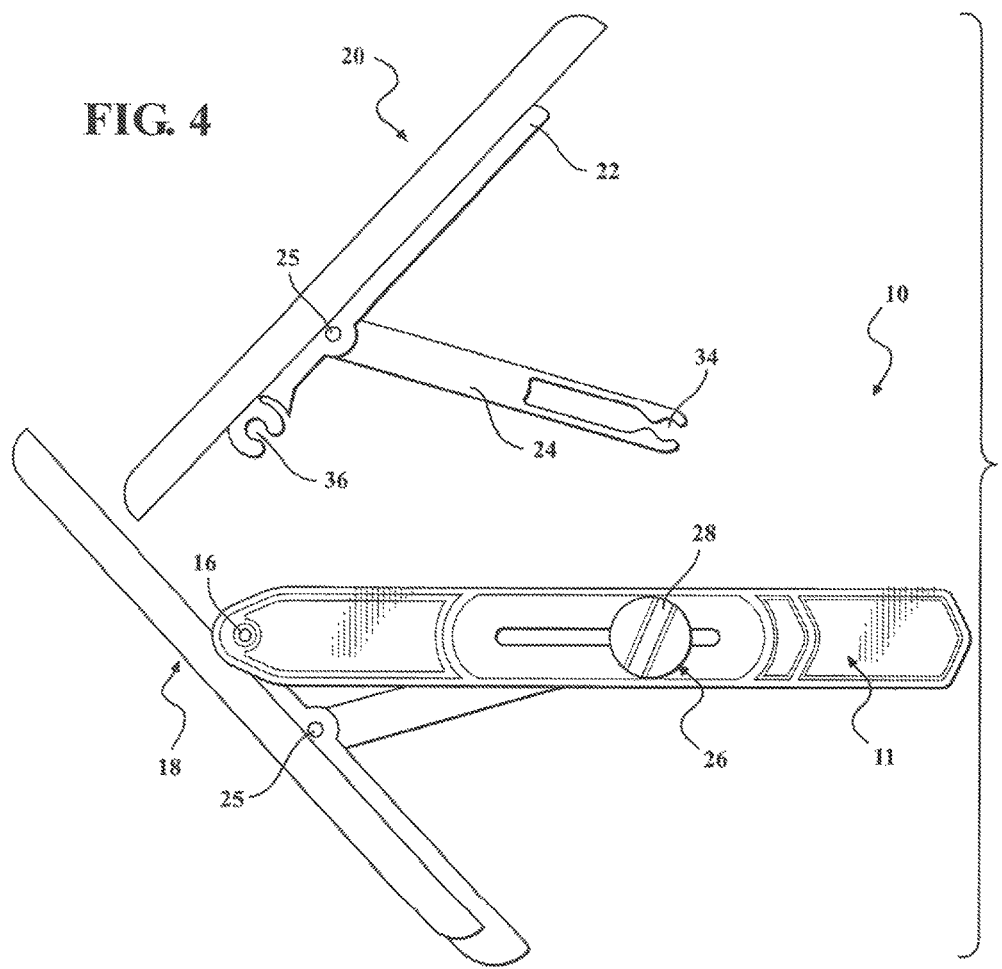
FIG. 4 is a top view of the angle divider of the present invention split for use on a miter saw.

With reference to FIGS. 3 and 4, the removable arm 20 is connected to the distal end pivot point 16 and the shaft 27 by snap fasteners 34 and 36. The snap fasteners 34 and 36 allow the removable arm 20 to be easily removed and reattached as desired.

The angle divider 10 is ideally suited to be used with miter type saws to cut for example molding, door frames, railing caps, etc. The common problem when cutting for example molding is that the joined walls and ceilings etc. are not even and the joint is not exactly at right angles. If the molding is cut at right angles, there will be gaps between the joint of the joined moldings and between the moldings and the wall or ceiling, etc.

To solve this problem, the angle divider 10 of the present invention is used to divide the angle of the joined material and transfer that divided angle to for example a miter saw to cut an exact angle. To use the angle divider 10, the arms 18 and 20 are pivoted out of the body 11 about the pivot point 16, see FIGS. 1 and 2. If the angle is an interior or exterior angle, the fingers 21 are retracted or extended and pivoted about the pivot points to fit against the sides of the joint. Once both fingers 21 are positioned against the sides of the joint, the lock 26 is locked which locks the fixed arm 18 at the desired angle. After the lock 26 is locked, the removable arm 20 is removed from the body 11. This divides the angle in half. The track 22 and bracket 24 are snapped from the pivot point 16 and the shaft 27 to remove the removable arm 20. The body 11 is then positioned against the back wall on for example the left side of the miter saw stand and the blade is adjusted to engage the side of the finger 21. This allows for the cutting of the molding by way of example at the exact ½ angle of the desired angle. The body is then re-positioned on the back wall of the other side, the right side in this example, of the miter saw and another piece of molding is cut to provide the other ½ of the desired angle.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. An angle divider comprising:
   a body portion 11 having a proximate end 12 and a distal end 14;
   a distal end pivot point 16 is positioned in the distal end 14 of the body portion 11;
   a fixed arm 18 and a removable arm 20 are pivotally mounted to the distal end pivot point 16, the arms 18 and 20 pivot with respect to the distal end pivot point 16;
   an adjustable pivot 28 mounted for sliding movement within an elongated slot 29 formed in body portion 11;
   brackets 24 interconnect arms 18 and 20 to adjustable pivot 28, movement of arms 18 and 20 results in movement of said adjustable pivot 28 longitudinally along body portion 11;
   a lock 26 is adapted to lock adjustable pivot 28 with respect to body portion 11, which locks arms 18 and 20 in place with respect to body portion 11;
   said removable arm 20 is removable from said distal end pivot point 16 and said adjustable pivot point 26 to split the angle;
   whereby said angle divider 10 of the present invention is used to divide the angle of joined material by removal of said removable arm 20 and transfer of that divided angle to a saw to cut an exact angle to match the joined material.

2. The angle divider of claim 1, wherein said removable arm 20 includes snap fasteners 34 and 36, said snap fasteners 34 and 36 connect to the distal end pivot point 16 and adjustable pivot 28 such that said removable arm 20 can be snapped on and off said distal end pivot point 16 and said adjustable pivot 28.

3. The angle divider of claim 1, wherein said arms 18 and 20 each include a sliding finger 21 and a track 22, said fingers 21 slide with respect to said tracks 22 to extend and retract with respect to said tracks 22 and said body portion 11.

4. The angle divider of claim 3, wherein said fingers 21 have a longitudinal extending edge, said tracks 22 have longitudinal extending channels that receive the longitudinal edge of the fingers 21 to allow the fingers 21 to slide with respect to the tracks 22.

5. The angle divider of claim 1, wherein said removable arm 20 includes snap fasteners 34 and 36, said snap fasteners 34 and 36 are adapted to snap over said distal end pivot point 16 and said adjustable pivot 28 to allow the removable arm 20 to be easily removed and reattached.

6. The angle divider of claim 1, wherein said body portion 11 has a top surface 30 and bottom surface 32 that are spaced from one another creating a cavity 33 for receipt of the arms 18 and 20 when the angle divider is in the closed position.

7. The angle divider of claim 6, wherein said adjustable pivot 25 includes a lock 26 and a shaft 27, said shaft 27 extends through said slot 29.

8. The angle divider of claim 7, wherein said shaft 27 extends through said top 30 and said bottom 32; a fastener connects the shaft 27 to the bottom 32 and said lock 26 connects said shaft 27 to said top 30.

9. The angle divider of claim 8, wherein said lock 26 is a knob that can be screwed against said top 30 and lock the position of said shaft 27 with respect to said slot 29.

10. The angle divider of claim 6, wherein said top 30 and bottom 32 are separated by said distal end pivot point 16 and a proximate end wall 33.

11. The angle divider of claim 1, wherein said adjustable pivot 25 includes a lock 26 and a shaft 27, said shaft 27 extends through said slot 29.

12. An angle divider comprising:
    a body portion 11 having a proximate end 12 and a distal end 14;
    a distal end pivot point 16 is positioned in the distal end 14 of the body portion 11;
    a fixed arm 18 and a removable arm 20 are pivotally mounted to the distal end pivot point 16, the arms 18 and 20 pivot with respect to the distal end pivot point 16;
    an adjustable pivot 28 mounted for sliding movement within an elongated slot 29 formed in body portion 11;
    brackets 24 interconnect arms 18 and 20 to adjustable pivot 28, movement of arms 18 and 20 results in movement of said adjustable pivot 28 longitudinally along body portion 11;
    a lock 26 is adapted to lock adjustable pivot 28 with respect to body portion 11, which locks arms 18 and 20 in place with respect to body portion 11;
    said removable arm 20 is removable from said distal end pivot point 16 and said adjustable pivot point 26 to split the angle;
    said body portion 11 has a top surface 30 and bottom surface 32 that are spaced from one another creating a cavity 33 for receipt of the arms 18 and 20 when the angle divider is in the closed position;
    whereby said angle divider 10 of the present invention is used to divide the angle of joined material by removal of said removable arm 20 and transfer of that divided angle to a saw to cut an exact angle to match the joined material.

13. The angle divider of claim 12, wherein said removable arm 20 includes snap fasteners 34 and 36, said snap fasteners 34 and 36 connect to the distal end pivot point 16 and adjustable pivot 28 such that said removable arm 20 can be snapped on and off said distal end pivot point 16 and said adjustable pivot 28.

14. The angle divider of claim 12, wherein said arms 18 and 20 each include a sliding finger 21 and a track 22, said fingers 21 slide with respect to said tracks 22 to extend and retract with respect to said tracks 22 and said body portion 11.

15. The angle divider of claim 14, wherein said fingers 21 have a longitudinal extending edge, said tracks 22 have longitudinal extending channels that receive the longitudinal edge of the fingers 21 to allow the fingers 21 to slide with respect to the tracks 22.

16. The angle divider of claim 12, wherein said removable arm 20 includes snap fasteners 34 and 36, said snap fasteners 34 and 36 are adapted to snap over said distal end pivot point 16 and said adjustable pivot 28 to allow the removable arm 20 to be easily removed and reattached.

17. The angle divider of claim 12, wherein said adjustable pivot 25 includes a lock 26 and a shaft 27, said shaft 27 extends through said slot 29.

18. The angle divider of claim 17, wherein said shaft 27 extends through said top 30 and said bottom 32; a fastener connects the shaft 27 to the bottom 32 and said lock 26 connects said shaft 27 to said top 30.

19. The angle divider of claim 18, wherein said lock 26 is a knob that can be screwed against said top 30 and lock the position of said shaft 27 with respect to said slot 29.

20. The angle divider of claim 12, wherein said top 30 and bottom 32 are separated by said distal end pivot point 16 and a proximate end wall 33.

\* \* \* \* \*